United States Patent [19]

Ball

[11] Patent Number: 5,583,855
[45] Date of Patent: Dec. 10, 1996

[54] ADD/DROP MULTIPLEXER APPARATUS

[75] Inventor: Peter R. Ball, Pinner, United Kingdom

[73] Assignee: Fujitsu Limited, Kanagawa, Japan

[21] Appl. No.: 336,539

[22] Filed: Nov. 9, 1994

[30] Foreign Application Priority Data

Nov. 10, 1993 [GB] United Kingdom ............... 9323170
Mar. 31, 1994 [GB] United Kingdom ............... 9406520

[51] Int. Cl.$^6$ .............................. H04J 3/08; H04L 12/42
[52] U.S. Cl. ........................................... 370/376; 370/460
[58] Field of Search ........................... 370/55, 68, 85.9, 370/85.12, 85.15, 112, 58.1; 340/825.05

[56] References Cited

U.S. PATENT DOCUMENTS

| | | | |
|---|---|---|---|
| 4,574,373 | 3/1986 | Ahola | 370/55 |
| 4,716,561 | 12/1987 | Angell et al. | 370/55 |
| 4,947,389 | 8/1990 | Eng. et al. | 370/60 |
| 4,965,790 | 10/1990 | Nishino et al. | 370/85.12 |
| 5,008,881 | 4/1991 | Karol | 370/85.15 |
| 5,247,518 | 9/1993 | Takiyasu et al. | 370/85.15 |
| 5,416,768 | 5/1995 | Jahromi | 370/55 |

OTHER PUBLICATIONS

K. R. Harrison, "The New CCITT Synchronous Digital Hierarchy: Introduction and Overview", British Telecommunications Engineering, vol. 10, July 1991, pp. 104–107.

ITU–T Recommendations G.707, "Synchronous Digital Hierarchy Bit Rates", International Telecommunications Union, Mar. 1993.

ITU–T Recommendations G. 708, "Network Node Interface for the Synchronous Digital Hierarchy", International Telecommunicaton Union, Mar. 1993.

ITU–T Recommendations G. 709, "Synchronous Multiplexing Structure", International Telecommunication Union, Mar. 1993.

*Primary Examiner*—Hassan Kizou

[57] ABSTRACT

A communications network, having an SDH transmission line with four main channels, is provided, at four different tributary connection nodes, with respective add/drop multiplexer units for permitting interchange of information signals between the main channels and tributary channels of the network connected to respective tributary ports. Each add/drop multiplexer unit includes a time slot interchange unit through which a pair of the main channels pass but which bypass the other two main channels. Because different pairs of the main channels pass through the different time slot interchange units, signal interchange is possible between any one of the main channels and any one of the tributary channels, even though the time slot interchange unit at each node need not have an interchange capability sufficient to enable signal interchange between each tributary channel at the node concerned and any one of the main channels. The add/drop multiplexer units can be located together at a single node, if required.

18 Claims, 14 Drawing Sheets

FIG. 13.

Example of connectivity in an 8 node ring

Connection matrix for Node 1 of an 8 node ring

| VC-4# | Link 1-2 | | | | Link 2-3 | | | | Link 3-4 | | | | Link 4-5 | | | | Link 5-6 | | | | Link 6-7 | | | | Link 7-8 | | | | Link 8-1 | | | |
|---|---|---|---|---|---|---|---|---|---|---|---|---|---|---|---|---|---|---|---|---|---|---|---|---|---|---|---|---|---|---|---|---|
| | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 |
| Traffic 1-2 | 9 | | | | | | | | | | | | | | | | | | | | | | | | | | | | | | | |
| Traffic 1-3 | 9 | | | | 9 | | | | | | | | | | | | | | | | | | | | | | | | | | | |
| Traffic 1-4 | | | | 9 | | | | 9 | | | | 9 | | | | | | | | | | | | | | | | | | | | |
| Traffic 1-5 | | | | 9 | | | | 9 | | | | 9 | | | | 9 | | | | | | | | | | | | | | | | |
| Traffic 1-6 | 9 | | | | 9 | | | | 9 | | | | 9 | | | | 9 | | | | | | | | | | | | | | | |
| Traffic 1-7 | | | | 9 | | | | 9 | | | | 9 | | | | 9 | | | | 9 | | | | 9 | | | | | | | | |
| Traffic 1-8 | | | | 9 | | | | 9 | | | | 9 | | | | 9 | | | | 9 | | | | 9 | | | | 9 | | | | |
| | 27 | 0 | 0 | 36 | 9 | 0 | 0 | 36 | 9 | 0 | 0 | 36 | 9 | 0 | 0 | 36 | 9 | 0 | 0 | 18 | 9 | 0 | 0 | 9 | 9 | 0 | 0 | 0 | 0 | 0 | 0 | 0 |

Traffic distribution matrix for traffic from Node 1

| | Link | | | | | | | | | | | | | | | |
| | 1_2 | 2_3 | 3_4 | 4_5 | 5_6 | 6_7 | 7_8 | 8_1 |
|---|---|---|---|---|---|---|---|---|
| VC-4#1 | 27 | 9 | 9 | 9 | 9 | 9 | 9 | 0 |
| VC-4#2 | 0 | 0 | 0 | 0 | 0 | 0 | 0 | 0 |
| VC-4#3 | 0 | 0 | 0 | 0 | 0 | 0 | 0 | 0 |
| VC-4#4 | 36 | 36 | 36 | 36 | 18 | 9 | 0 | 0 |

Traffic distribution matrix for traffic from all nodes

| | Link | | | | | | | | | | | | | | | |
| | 1_2 | 2_3 | 3_4 | 4_5 | 5_6 | 6_7 | 7_8 | 8_1 |
|---|---|---|---|---|---|---|---|---|
| VC-4#1 | 63 | 63 | 63 | 63 | 63 | 63 | 63 | 63 |
| VC-4#2 | 63 | 63 | 63 | 63 | 63 | 63 | 63 | 63 |
| VC-4#3 | 63 | 63 | 63 | 63 | 63 | 63 | 63 | 63 |
| VC-4#4 | 63 | 63 | 63 | 63 | 63 | 63 | 63 | 63 |

ADD/DROP MULTIPLEXER APPARATUS

BACKGROUND OF THE INVENTION

1. Field of the Invention

The present invention relates to add/drop multiplexer apparatus for use, for example, in synchronous digital hierarchy (SDH) communications networks to connect tributary channels of the network to main channels thereof.

2. Description of the Related Art

FIG. 1 of the accompanying drawings shows one example of an STM-4 add/drop multiplexer (ADM) previously considered for use in an SDH network. An optical transmission line 2, for example an optical ring, carrying a synchronous transport module at level 2 of the SDH hierarchy (STM-4), passes through the ADM 1. The bit rate of the STM-4 module is 622.08 Mbit/s (hereinafter 622 Mbit/s).

Each STM-4 module carries four SDH level 1 (STM-1) modules in time-division multiplexed form. These four STM-1 modules can be regarded as providing the transmission line 2 with four separate 155.52 Mbit/s (hereinafter 155 Mbit/s) main channels extending in parallel. Each STM-1 module (main channel) can be used to transport a plurality of individual lower-bit-rate information signals (tributary signals), and FIG. 2 of the accompanying drawings shows one example of the structure of an STM-1 module used to transport up to 63 2.048 Mbit/s (hereinafter 2 Mbit/s) tributary signals.

As shown in FIG. 2, each 2 Mbit/s tributary signal to be transported within an STM-1 module is incorporated in a container C-12. A path overhead (POH) is added to the container to form a virtual container VC-12. This path overhead (POH) contains information identifying the tributary signal concerned, error checking information, and information identifying the type of container (in this case 2 Mbit/s) involved.

Each virtual container VC-12, has, associated therewith, a pointer indicating the start point of the virtual container VC-12 concerned in its STM-1 frame, the virtual container and its pointer together forming a tributary unit TU-12. Thus, the containers C-12 are the respective payloads of the tributary units TU-12.

In FIG. 2, the 63 tributary units TU-12 which can be accommodated within an STM-1 module are combined in groups of 3 to form twenty-one tributary-unit groups TUG-2. These groups are then further combined, by bit interleaving and addition of path overheads (POH), to form a higher-order virtual container VC-4 which is located within the module by means of a further pointer. The higher-order virtual container VC-4 and its associated pointer constitute an administrative unit (AU). In the example shown in FIG. 2, the administrative unit AU-4 forms the entire payload of the module STM-1, the module only further including section overhead (SOH) required for transmission purposes.

Further information on SDH networks can be found, for example, in "The New CCITT Synchronous Digital Hierarchy: Introduction and Overview", Harrison K. R., British Telecommunications Engineering, Vol. 10, July 1991, page 104, and in ITU-T Recommendations G.707 (Synchronous Digital Hierarchy Bit Rates), G.708 (Network Node Interfaces for the Synchronous Digital Hierarchy) and G.709 (Synchronous Multiplexing Structure).

Returning now to FIG. 1, in the ADM 1 first and second VC-4 time slot assignment units (TSA) 3a and 3b are provided at the interfaces of the ADM with respective left-hand and right-hand portions 2a and 2b of the optical transmission line 2. These TSAs 3a and 3b are multiplexers/demultiplexers (muldems) and signal distributors which serve to provide access to the four higher-order virtual containers VC-4 in an STM-4 module; thus, the TSA 3a serves to provide access to the four VC-4s in the STM-4 module carried by the left-hand transmission line portion 2a, and the TSA 3b serves to provide access to the four VC-4s in the right-hand transmission line portion 2b.

The ADM 1 is also connected, via respective interface units 5a, 5b and 5c thereof, to three tributary channels 6a, 6b and 6c, each of which can carry an STM-1 module or a single 140 Mbit/s, 45 Mbit/s or 34 Mbit/s tributary signal or up to twenty-one 2 Mbit/s tributary signals.

The ADM 1 further includes a time slot interchange unit (TSI) 10 which has six ports $P_1$ to $P_6$. The first port $P_1$ of the TSI 10 is connected via the TSA 3a to access a first higher-order virtual container VC-4#1 of the transmission line portion 2a. The second and third ports $P_2$ and $P_3$ of the TSI 10 are connected via the interface units 5b and 5c to access respectively the tributary signals of the tributary channels 6b and 6c. The fourth port $P_4$ of the TSI is unused in this example. The fifth and sixth ports $P_5$ and $P_6$ are connected via the TSA 3b to access respectively first and second higher-order virtual containers VC-4#1 and VC-4#2 of the transmission line portion 2b.

The interface unit 5a is connected to access a second higher-order virtual container VC-4#2 of the transmission line portion 2a, and the third and fourth higher-order virtual containers VC-4#3 and VC-4#4 of the transmission line portion 2a are connected respectively to the corresponding third and fourth higher-order virtual containers VC-4#3 and VC-4#4 of the transmission line portion 2b.

The TSI 10 is essentially a patch panel provided between two multiplexers/demultiplexers, and in use of the ADM 1 serves to permit any virtual container in a channel connected to one of its ports to be added to or dropped from another channel connected to another of its ports.

Ideally, in the example shown in FIG. 1, the TSI 10 would enable any VC-12 in any of the tributary channels to be added to/dropped from any of the VC-4s in the transmission line 2. However, this would require the TSI to have access to all four VC-4s in each transmission line portion 2a or 2b, and also access to all the tributary signals. In turn, this would require the TSI to have eleven ports, and, because each VC-4 can contain up to sixty-three VC-12s, a capability of interchanging 693 (=11×63) VC-12s. However, the number of electronic circuitry gates required to provide a time slot interchange unit having such a virtual container interchange capability is prohibitively high and, even if technically feasible, the cost cannot always be justified at each tributary connection node (add/drop location) of a network.

Presently, a TSI having six ports and a maximum virtual container interchange capability of 378 (=6×63) VC-12s is contemplated. This falls far short of the desired virtual container interchange capability mentioned above and leads to system design limitations such as, for example in FIG. 1, the inability to add VC-12s of the tributary channels 6b and 6c to the third and fourth VC-4s VC-4#3 and VC-4#4 of either transmission line portion 2a or 2b. In addition, there is no continuity between the second VC-4 of the transmission line portion 2a and the second VC-4 of the transmission line portion 2b so that effectively one of the four main channels of the transmission line 2 is broken at the ADM 1; in FIG. 1 all VC-12s of the tributary channel 6a are passed by the TSA 3a to the second VC-4 of the transmission line portion 2a.

In view of the limited capabilities of present time slot interchange units, alternative ways have been proposed of realising a 2-622 Mbit/s ADM capable of adding/dropping 2 Mbit/s signals to/from any of the VC-4s in an STM-4 module.

In one such proposal, illustrated in FIG. 3 of the accompanying drawings, access to the individual 2 Mbit/s signals in all four VC-4s in each transmission line portion 2a or 2b is achieved by providing a 155-622 Mbit/s add/drop line terminal 50 and four 2-155 Mbit/s add/drop line terminals 60 at each transmission line interface. The proposal also uses a 2 Mbit/s patch panel 70 having ports for connection to all the accessed 2 Mbit/s signals of the VC-4s of the two transmission line portions 2a and 2b, and also has further ports for adding/dropping 2 Mbit/s tributary signals.

This arrangement is disadvantageous, however, since it uses a relatively large amount of hardware. Also, because it makes use of STM-4 and STM-1 line terminal equipment, the SDH signals are terminated at the 2 Mbit/s interfaces between the add/drop line terminals 60 and the patch panel 70 so that end-to-end path monitoring capability is lost.

A further proposal, shown in FIG. 4 of the accompanying drawings, uses a VC-4 time slot assignment unit 80 and a VC-12 time slot assignment unit 90 at each transmission line interface to provide access to all the VC-12s carried by the STM-4 modules in each transmission line portion 2a or 2b. A VC-12 cross-connect unit 100 has ports connected to all the accessed VC-12s and also further ports for adding/dropping VC-12s to/from tributary channels. The disadvantage of this proposal is that the switch matrix required is complex and requires sophisticated control.

SUMMARY OF THE INVENTION

According to the present invention there is provided add/drop multiplexer apparatus, for connection to main channels and a tributary channel of a communications network, including a first signal interchange unit, through which a first such main channel passes when the apparatus is in use, having a tributary port for connection to such a tributary channel, which unit is operable to cause an information signal to pass between a first such main channel and that tributary channel when the apparatus is in use, and the apparatus also including a second signal interchange unit, through which the said first main channel and a second such main channel pass when the apparatus is in use, operable to cause the said information signal to pass between the first and second main channels, thereby enabling such an information signal to be transferred between the said tributary channel and the said second main channel.

Such apparatus can enable the transfer of an information signal between the tributary channel connected to the first signal interchange unit and the second main channel of the network, even though that interchange unit does not itself provide access to the second main channel. As a result the signal interchange capability of each signal interchange unit can be reduced from that which would be required by a single signal interchange unit used to facilitate interchange of an information signal between the tributary channel and either one of the first and second main channels.

Preferably the said second signal interchange unit also has a tributary port for connection to a further such tributary channel and is operable to cause the said information signal to pass between the said first main channel and that further tributary channel. This can enable transfer of an information signal between the respective tributary channels of the first and second signal interchange units.

A third signal interchange unit may be used, through which the said second main channel and a third such main channel pass, which unit is operable to cause an information signal to pass between the second and third main channels. In this case, it is preferable that the said third main channel also passes through the said first signal interchange unit, that unit being operable to cause such an information signal to pass between its said tributary channel and the said third main channel. In this way, an information signal can pass, via the third main channel, between the tributary channel of the first signal interchange unit and the second main channel, whilst another information signal passes between the tributary channel of the second interchange unit and the first main channel, even though the first signal interchange unit itself provides no access to the second main channel. Furthermore, because in this arrangement each main channel passes through only two out of the three signal interchange units (the second main channel bypasses the first signal interchange unit, the third main channel bypasses the second signal interchange unit, and the first main channel bypasses the third signal interchange unit) the series connection of the three signal interchange units imposes less end-to-end delay on signals carried by the main channels than if all three main channels passed through each signal interchange unit.

For full connection versatility it is preferable that there are as many signal interchange units in total as there are main channels of the network. The units are connected to the main channels in a cyclic fashion such that a different pair of the main channels passes through each of the units. When the communications network is a ring network having four main channels, it is preferable that there are (8+4n) such signal interchange units, where n is zero or a positive integer, arranged at respective connection nodes around the ring network. When the traffic distribution around the ring network is uniform this can enable the bandwidth utilisation to be equal to that which can be achieved using a full cross-connect capability at each node.

The communications network is, for example, a synchronous digital hierarchy network the said main channels of which are provided by respective higher-order virtual containers, for example virtual containers VC-4s, and the said information signals are transported through the network in respective lower-order virtual containers, for example virtual containers VC-11s or VC-12s. Each VC-4 can transport up to 63 VC-12s.

In one embodiment, which can provide a distributed add/drop multiplexer, a series of individual add/drop multiplexer devices are arranged in series at different respective connection nodes along a transmission line of the communications network, this transmission line providing the said main channels of the network between adjacent devices of the series. Each device includes one of the said signal interchange units and two muldem units, connected respectively to the two sides of the said transmission line at the connection node concerned and also connected within the device to one another and to the signal interchange unit of the device. The muldem units serve to provide access to the individual main channels of the transmission line on each of the said two sides thereof and also serve to connect two of the accessed main channels of one side and the corresponding two accessed main channels of the other side to the signal interchange unit of the device, whilst connecting the remaining accessed main channel(s) of the said one side directly to the corresponding accessed main channel(s) of the said other side. Such an embodiment is cost-effective because it can make use of signal interchange units having a relatively low signal interchange capability at each node.

Also, it is usual for the tributary channels of a network to be distributed along the transmission line so that some form of distributed add/drop multiplexing facility is normally required.

When such distributed add/drop multiplexer apparatus is used in a ring network in which the traffic distribution is hubbed rather than uniform, an add/drop multiplexer device at the hub connection node preferably includes two of the said signal interchange units and two muldem units connected respectively to the two sides of the said transmission line at the hub connection node, and also connected within the device to the two signal interchange units of the device. The muldem units serve to provide access to the individual main channels of the transmission line on each of the said two sides thereof and also serve to connect two of the accessed main channels of one side and the corresponding two accessed main channels of the other side to one of the said two signal interchange units of the device and to connect the remaining accessed main channel(s) of the said one side and the corresponding accessed main channel(s) of the said other side to the other of the said two signal interchange units of the device, so that at the hub connection node there is access to all of the main channels of the transmission line.

Alternatively, the said signal interchange units may be connected together in series within a single add/drop multiplexer device arranged at a connection node along a transmission line used to provide the main channels. In this case, the device need include only two muldem units connected respectively to the two sides of the said transmission line at the said connection node and also connected respectively to the first and last signal interchange units of the said series, which muldem units serve to provide access to the individual main channels of the transmission line on each of the said two sides thereof. The main channels need not be multiplexed between each pair of adjacent signal interchange units of the series and can pass along respective channel connection lines of the device, so avoiding the need for muldems between each pair.

The above-mentioned transmission line can be a higher-rate synchronous digital hierarchy transmission line STM-N, for example an STM-4 (622 Mbit/s) or STM-16 (2488.32 Mbit/s) line.

BRIEF DESCRIPTION OF THE DRAWINGS

In the drawings:

FIG. 13 shows a table presenting an example of the traffic distribution in the FIG. 10 ring network.

DESCRIPTION OF THE PREFERRED EMBODIMENTS

Figure 5A:
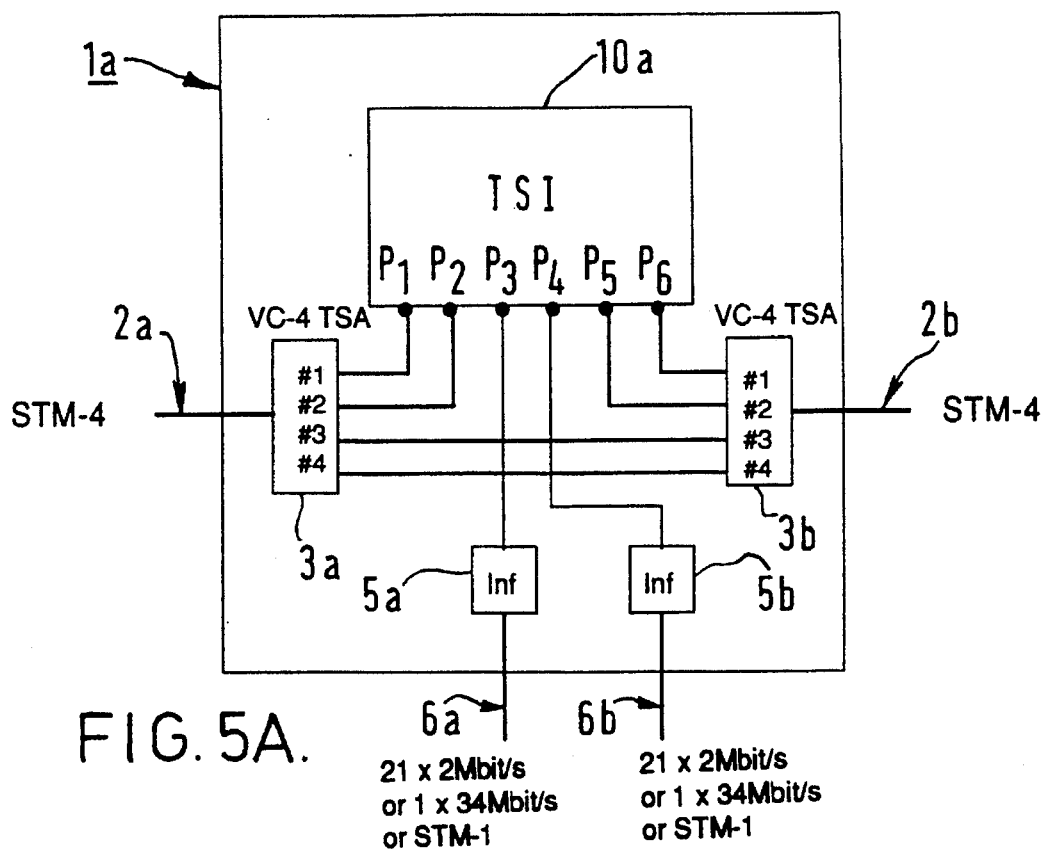
FIGS. 5A to 5D are respective block diagrams of add/drop multiplexer units for use in explaining a principle of the present invention.

The add/drop multiplexer unit 1a of FIG. 5A is arranged at a first tributary connection node (node 1) of an STM-4 transmission line 2 of an SDH network, which line is used for carrying an STM-4 synchronous transport module. As explained previously, this STM-4 module in fact comprises four STM-1 synchronous transport modules multiplexed together, and each STM-1 module carries a higher-order virtual container VC-4 having a data capacity of up to 63 2 Mbit/s information signals. The higher-order virtual containers VC-4s can be regarded as providing respective main channels of the transmission line 2.

Figure 1:
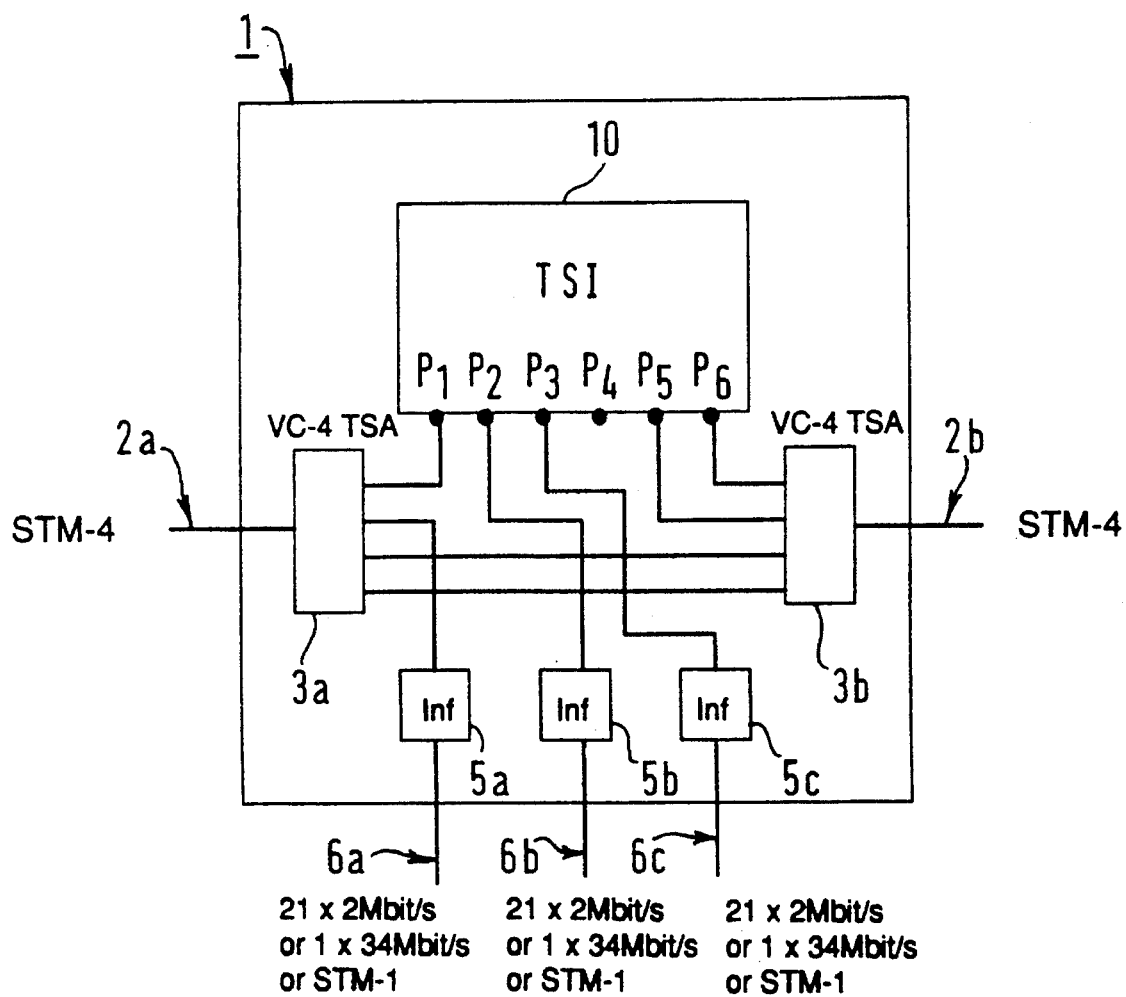
FIG. 1, discussed hereinbefore, is a block diagram of an example of a previously-considered STM-4 add/drop multiplexer.
Figure 2:
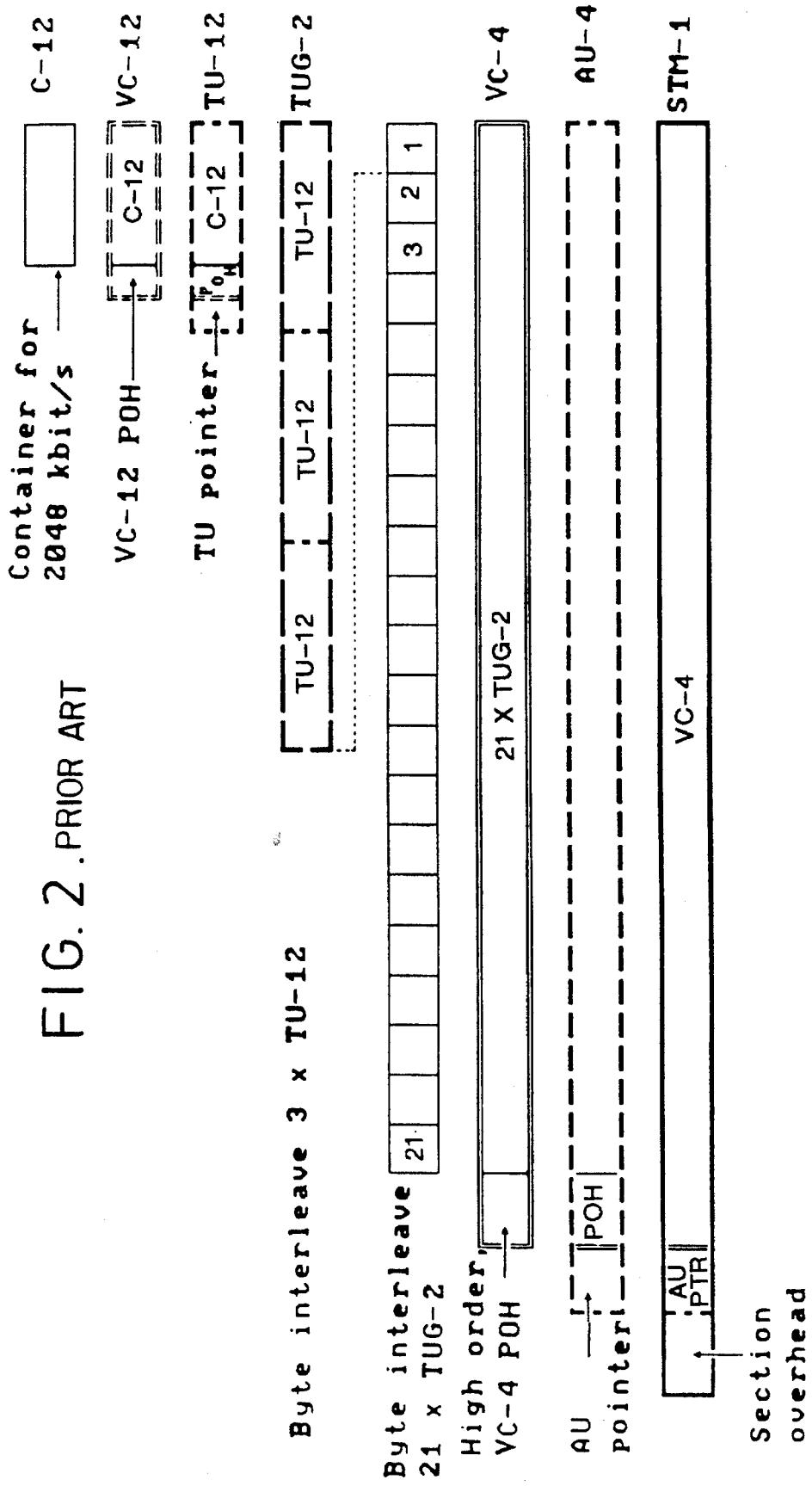
FIG. 2, also discussed hereinbefore, is a diagram for use in explaining a data transport structure used in a synchronous transport module of a synchronous digital hierarchy communications network.

The unit 1a of FIG. 5A has the same basic constitution as the add/drop multiplexer shown in FIG. 1, and includes a first time slot assignment unit (TSA) 3a connected to a first portion 2a of the SDH transmission line 2, a second TSA 3b connected to a second transmission line portion 2b, first and second interface units 5a and 5b connected to respective tributary channels 6a and 6b of the network, and a first time slot interchange unit (TSI) 10a.

As shown in FIG. 5A, the information signals carried by the tributary channels 6a, 6b can be plesiochronous digital hierarchy (PDH) signals, in this example 21 2.048 Mbit/s PDH signals multiplexed together or a single 34 Mbit/s PDH signal, or synchronous digital hierarchy (SDH) signals, in this example a single STM-1 SDH signal.

For the purposes of explanation, it will be assumed hereinafter that the node 1 tributary channels 6a and 6b (and also the tributary channels at all the other tributary connection nodes to be described later with reference to FIGS. 5B to 5D) are all single STM-1 SDH channels, each STM-1 channel carrying up to 63 2 Mbit/s information signals in respective virtual containers VC-12. However, as will be understood, the tributary channels need not all be of the same type, and PDH and SDH information signals can be mixed between different nodes and even between the two different tributary channels at the same node.

In the case of non-SDH tributary signals, the interface units 5a and 5b serve as necessary to produce from non-SDH information signals in the tributary channels suitable SDH virtual containers, e.g. VC-12s from 2 Mbit/s PDH information signals, for addition to the main channels (higher-order virtual containers VC-4s) of the transmission line 2. Similarly, virtual containers VC-12s carried by the transmission line 2 that are to be dropped to a non-SDH tributary channel are converted to the appropriate non-SDH information signal, e.g. virtual containers VC-12 are converted into 2 Mbit/s PDH information signals, as they pass through the interface units 5a and 5b into the tributary channels 6a and 6b.

In FIG. 5A, the time slot interchange unit 10a of the unit 1a has six ports $P_1$ to $P_6$. These ports are, however, connected differently from the ports of the time slot interchange unit 10 in the exemplary ADM shown in FIG. 1. In particular, the ports $P_1$, $P_2$, $P_5$ and $P_6$ are connected via the TSAs 3a and 3b to provide the TSI 10a at the first tributary connection node with access to the first and second main channels of the transmission line 2, i.e. the TSI 10a has access to the first and second VC-4s VC-4#1 and VC-4#2 of the respective STM-4 modules carried by the first and second transmission line portions 2a and 2b. The remaining two ports $P_3$ and $P_4$ of the TSI 10a are connected via the interface units 5a and 5b to the tributary channels 6a and 6b. The third and fourth VC-4s VC-4#3 and VC-4#4 of the STM-4 modules carried by the transmission line portions 2a and 2b pass directly between the TSAs 3a and 3b, so that the TSI 10a does not have access to the third or fourth main channels of the transmission line 2.

By virtue of the connection arrangement shown in FIG. 5A, all four main channels (VC-4s) of the transmission line 2 pass through the add/drop multiplexer unit 1a, and virtual containers VC-12 of the tributary channels 6a and 6b can be added to or dropped from the first and second main channels (VC-4#1 and VC-4#2) of the transmission line 2. The TSI 10a need have a virtual container interchange capability of only 378 (=6×63) VC-12s.

At a second tributary connection node (node 2) along the transmission line 2, a second add/drop multiplexer unit 1b is provided, this unit being connected to the first add/drop multiplexer unit 1a by the second portion 2b of the transmission line. The second add/drop multiplexer unit 1b of FIG. 5B is constituted similarly to the first add/drop multiplexer unit 1a of FIG. 5A, and has first and second TSAs 3c and 3d, interface units 5c and 5d, and a time slot interchange unit 10b having the same time slot interchange capability (378 VC-12s) as the time slot interchange unit 10a. A third transmission line portion 2c is connected to the second TSA 3d, and respective tributary channels 6c and 6d are connected to the interface units 5c and 5d.

Figure 5B:
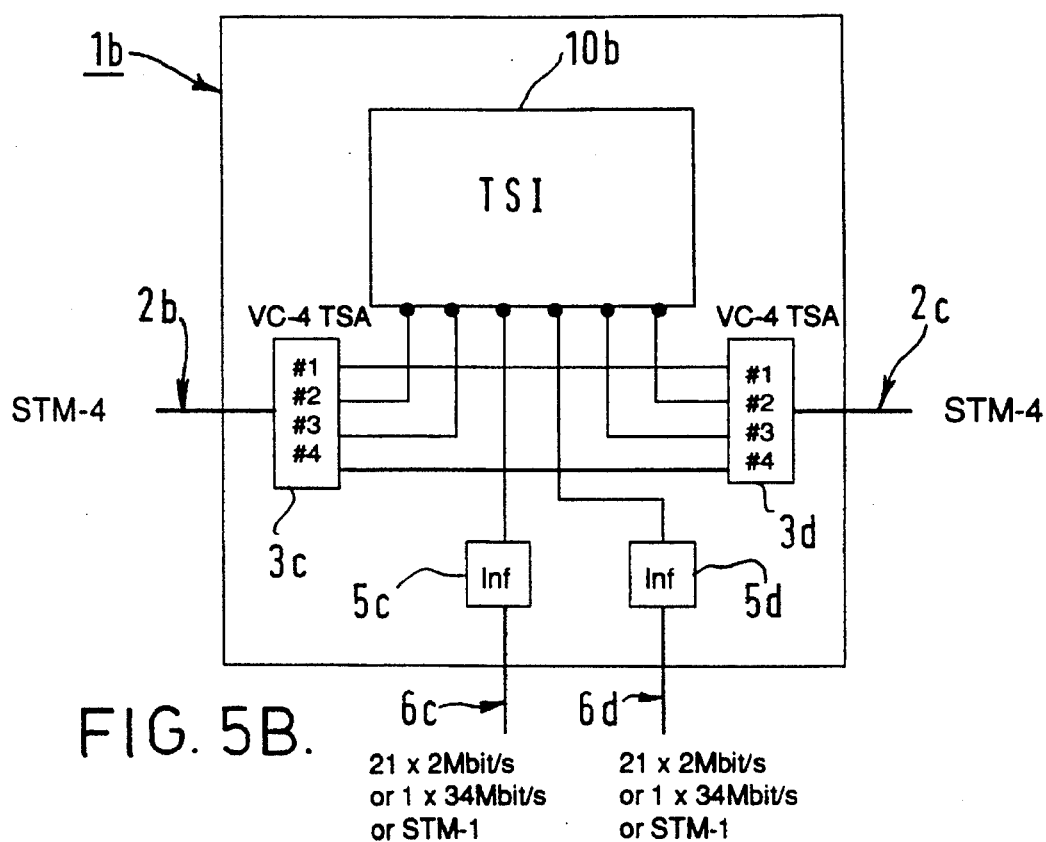

In the add/drop multiplexer unit 1b of FIG. 5B, however, the connection arrangement is different from that used in the add/drop multiplexer unit 1a of FIG. 5A. In the add/drop multiplexer unit 1b, the second and third main channels (VC-4#2 and VC-4#3) are routed through the TSI 10b, and the first and fourth main channels (VC-4#1 and VC-4#4) pass directly between the TSAs 3c and 3d. Because the first and second add/drop multiplexer units 1a and 1b are connected together by the second transmission line portion 2b, if a VC-12 of one of the tributary channels 6a or 6b of node 1 is inserted by the TSI 10a at that node into the second main channel (VC-4#2), the inserted VC-12 will pass into the TSI 10b of the second add/drop multiplexer unit 1b at node 2 and can either be dropped to one of the tributary channels 6c or 6d of node 2 or it can be passed on further to the third transmission line portion 2c via the second or third main channel (VC-4#2 or VC-4#3). Thus, although a VC-12 from the node 1 tributary channels 6a and 6b could not be inserted at node 1 into the third main channel (VC-4#3) of the transmission line 2, because that third main channel does not pass through the TSI 10a of the add/drop multiplexer unit 1a at node 1, the use of the two add/drop multiplexer units 1a and 1b connected together can enable such a virtual container from the node 1 tributary channels to reach the third main channel (VC-4#3).

Figure 5C:
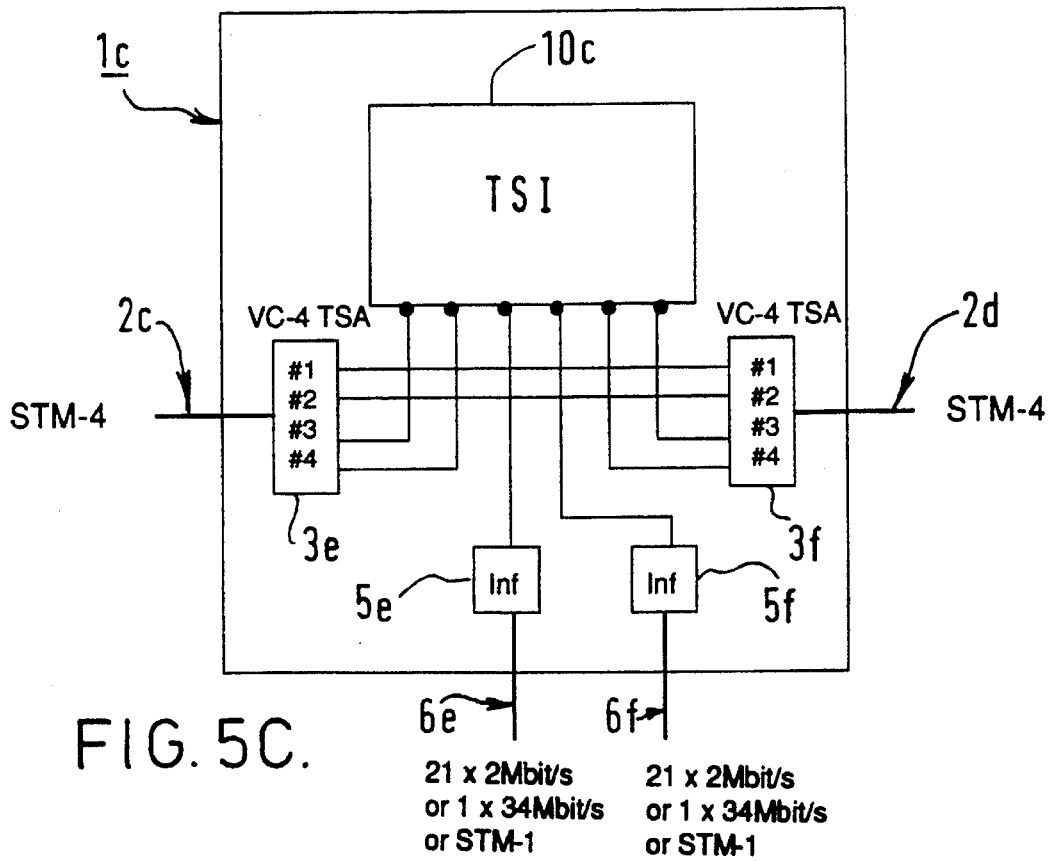
Figure 5D:
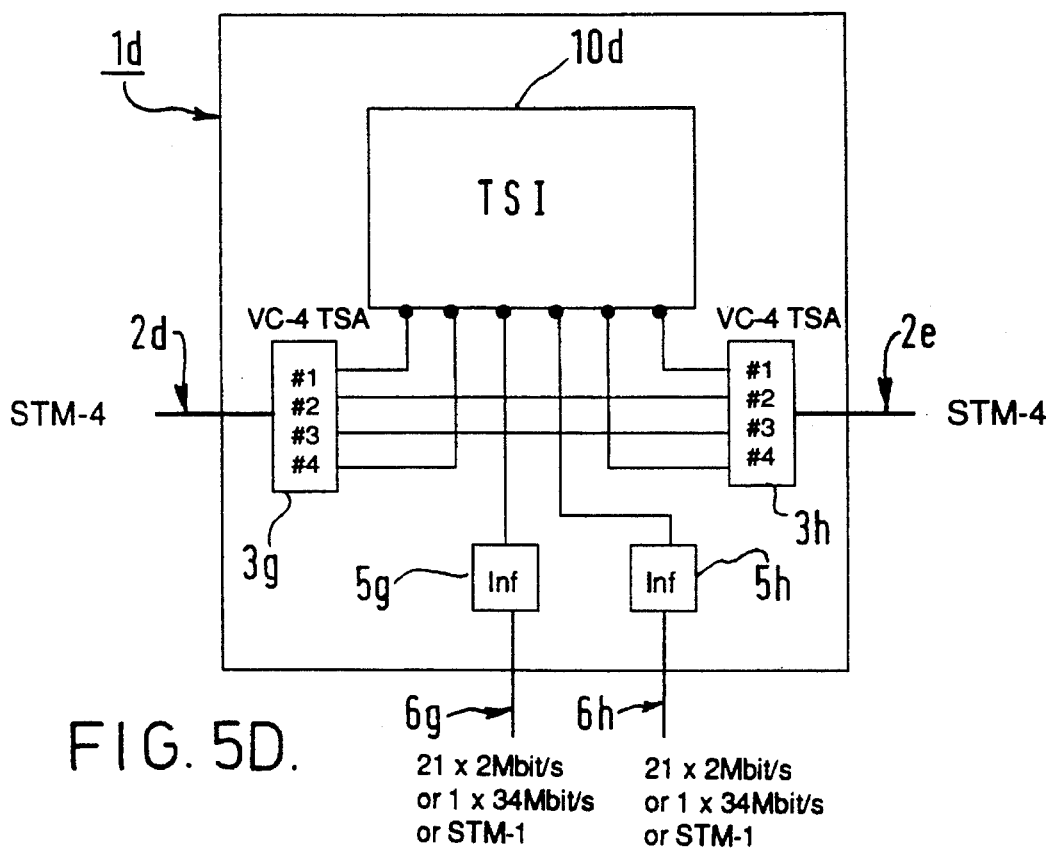

To provide further versatility, a third add/drop multiplexer unit 1c, as shown in FIG. 5C, can be provided at a third tributary connection node (node 3) along the transmission line 2. In the third add/drop multiplexer unit 1c the third and fourth main channels (VC-4#3 and VC-4#4) pass through the TSI 10c, whilst the first and second main channels pass directly between the TSAs 3e and 3f. Accordingly a virtual container VC-12 of one of the node 1 tributary channels 6a or 6b can reach the fourth main channel (VC-4#4) of the transmission line 2 at node 3, having been added to the second main channel (VC-4#2) by the TSI 10a in the add/drop multiplexer unit 1a of node 1, passed into the third main channel (VC-4#3) by the TSI 10b in the add/drop multiplexer unit 1b of node 2, and then finally passed into the fourth main channel by the TSI 10c in the add/drop multiplexer unit 1c of node 3. Alternatively, the added VC-12 can be dropped from the third main channel (VC-4#3) to one of the tributary channels 6e or 6f at node 3.

The addition, at a fourth tributary connection node (node 4) along the transmission line 2, of a fourth add/drop multiplexer unit 1d, in which the first and fourth main channels (VC-4#2 and VC-4#3) pass through the TSI 10d and the second and third main channels pass directly between the TSAs 3g and 3h, provides full versatility of interconnection. Thus, for example, a virtual container VC-12 of one of the node 1 tributary channels 6a or 6b, added into the first main channel (VC-4#1) at node 1, can reach the fourth main channel via the TSI 10d in the add/drop multiplexer unit 1d of node 4.

When there are as many add/drop multiplexer units as there are main channels, any tributary channel virtual container can be added to or dropped from any of the main channels, by virtue of the "cyclic manner" in which the TSI of the series of add/drop multiplexer units are connected.

Figure 6:
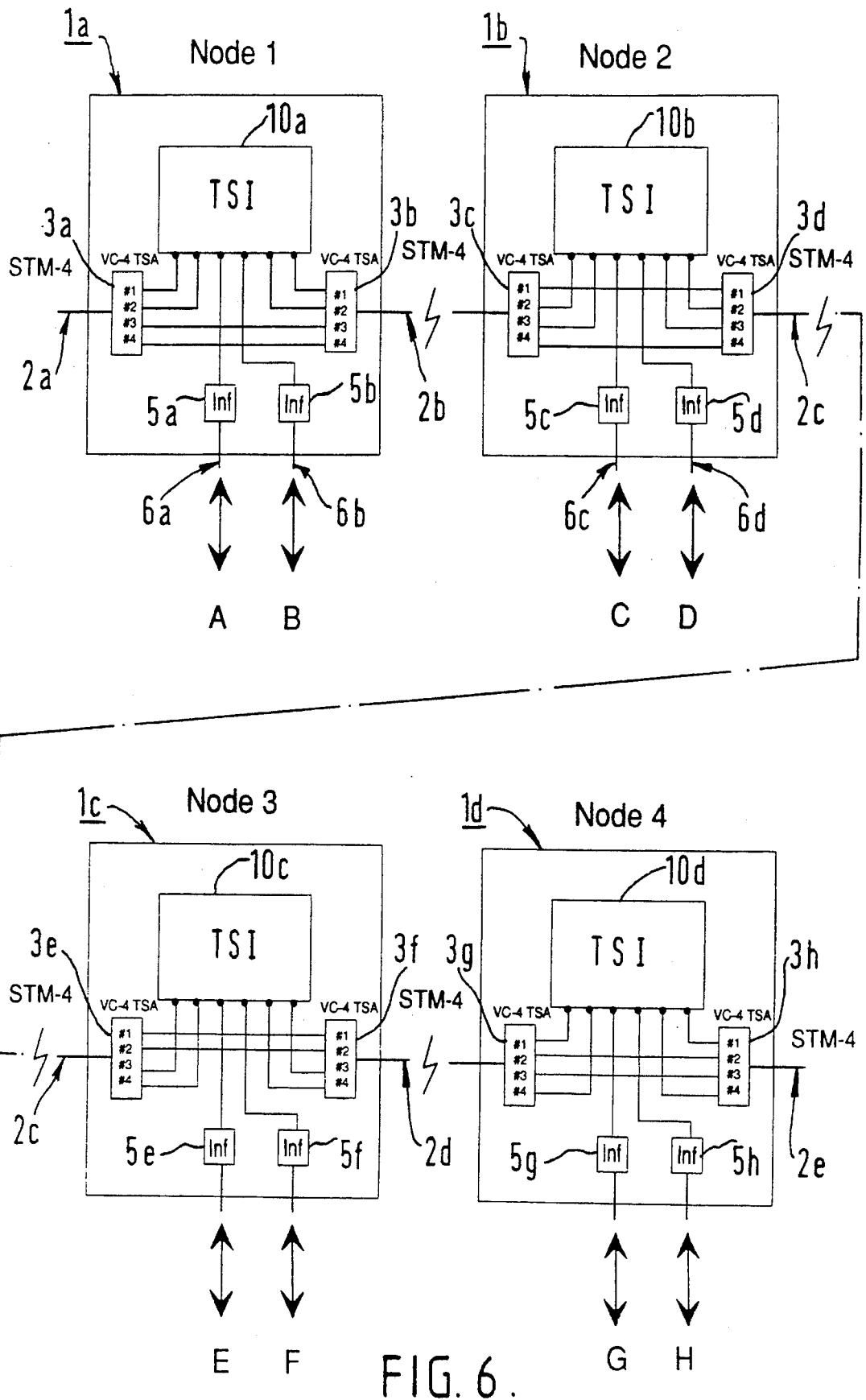
FIG. 6 is a block diagram showing the four add/drop multiplexer units of FIG. 5A to 5D connected together to form a distributed add/drop multiplexer embodying the present invention.

FIG. 6 shows the four add/drop multiplexer units 1a to 1d of FIGS. 5A to 5D connected together to form a distributed 2-622 Mbit/s add/drop multiplexer. This distributed multiplexer has two tributary ports A, B; C, D; E, F; and G, H at each node 1 to 4, and tributary signals input to the tributary ports at any one node can be directed to the tributary ports of any other node even though at each node there is access to only two main channels of the transmission line 2.

For example, consider a 2 Mbit/s tributary signal applied at tributary port A which it is required to drop at tributary port F. The add/drop multiplexer unit 1a at node 1 provides access to the first and second main channels (VC-4#1 and VC-4#2) but the add/drop multiplexer unit 1c at node 3 only provides access to the third and fourth main channels (VC-4#3 and VC-4#4). Thus, the VC-12 associated with the applied 2 Mbit/s tributary signal should be inserted into the second main channel (VC-4#2) by the TSI 10a at node 1. At node 2, this VC-12 should be transferred to the third main channel (VC-4#3) by the TSI 10b at that node. When the VC-12 arrives at node 3 it will therefore be in a main channel (VC-4), in this case the third main channel (VC-4#3), which is connected to the TSI 10c of this node, and hence the VC-12 concerned can be dropped to the tributary port F.

The routing of the virtual containers can be accomplished via the usual control facilities available in the processing cards of an add/drop multiplexer unit.

It will be seen that a distributed 2-622 Mbit/s multiplexer as shown in FIG. 6 has the advantage that the equipment at each node is simpler, and hence cheaper, than would be the case if at each node there was provided a 2-622 Mbit/s multiplexer which had sufficient processing to enable all main channels (VC-4s) in the STM-4 transmission line to be accessed.

Furthermore, as interchange of the VC-12s does not occur at each node through which a VC-12 passes, the end-to-end delay will be less than an equivalent system in which VC-12 interchange occurred in each node.

Figure 7:
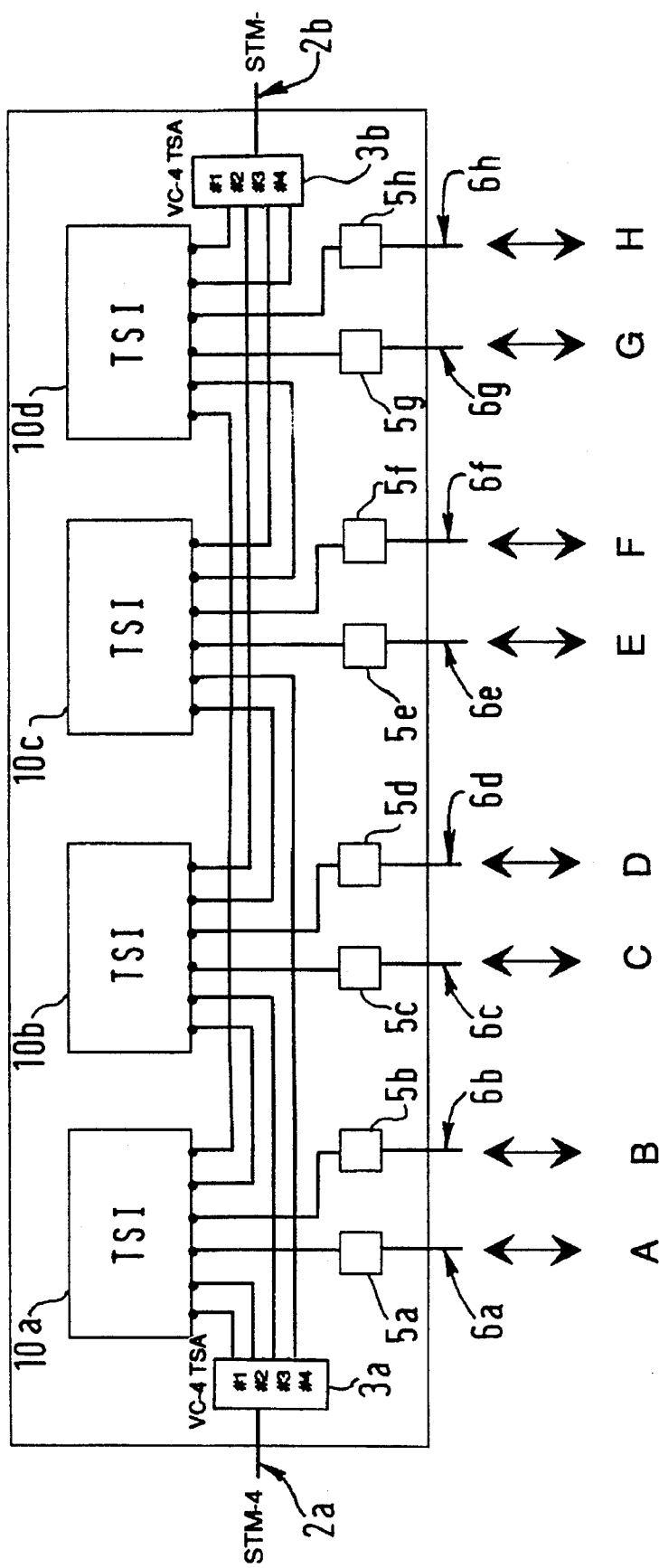
FIG. 7 is a block diagram of another add/drop multiplexer embodying the present invention.

Although FIG. 6 shows a distributed 2-622 Mbit/s add/drop multiplexer, it will be appreciated that in other embodiments of the present invention it is possible for a series of add/drop multiplexer units to be located at the same node on a transmission line, to form a single piece of equipment, as shown in FIG. 7. The FIG. 7 equipment comprises the four TSIs 10a to 10d connected together in the "cyclic manner" described above with reference to FIGS. 5A to 5D and 6, but the interfaces between adjacent TSIs within the equipment can be provided in each case by four electrical signal lines carrying respective higher-order virtual containers VC-4s. Accordingly, the FIG. 7 equipment needs only two time slot assignment (TSA) units 3a and 3b to serve as electrical/optical interface units for generating the optical STM-4 signals for transmission along the transmission line 2. Thus, the FIG. 7 equipment can be considerably smaller than a series of four optically-connected add/drop multiplexer units 1a to 1d.

Figure 3:
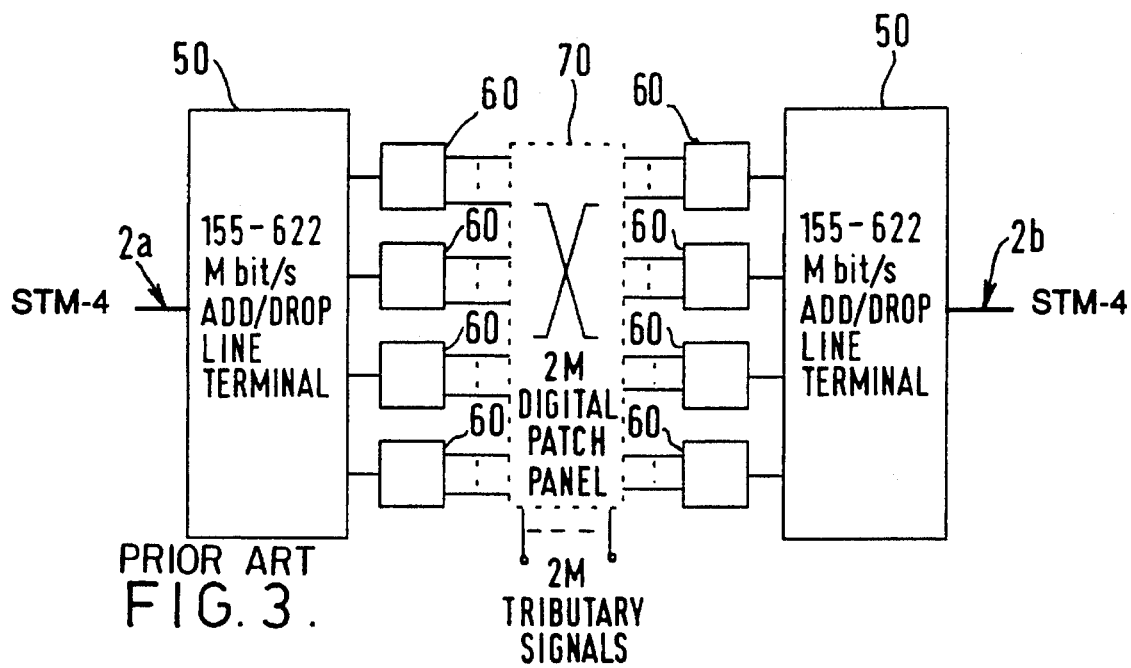
FIGS. 3 and 4, also discussed hereinbefore, are respective block diagrams of further previously-considered STM-4 add/drop multiplexers.
Figure 4:
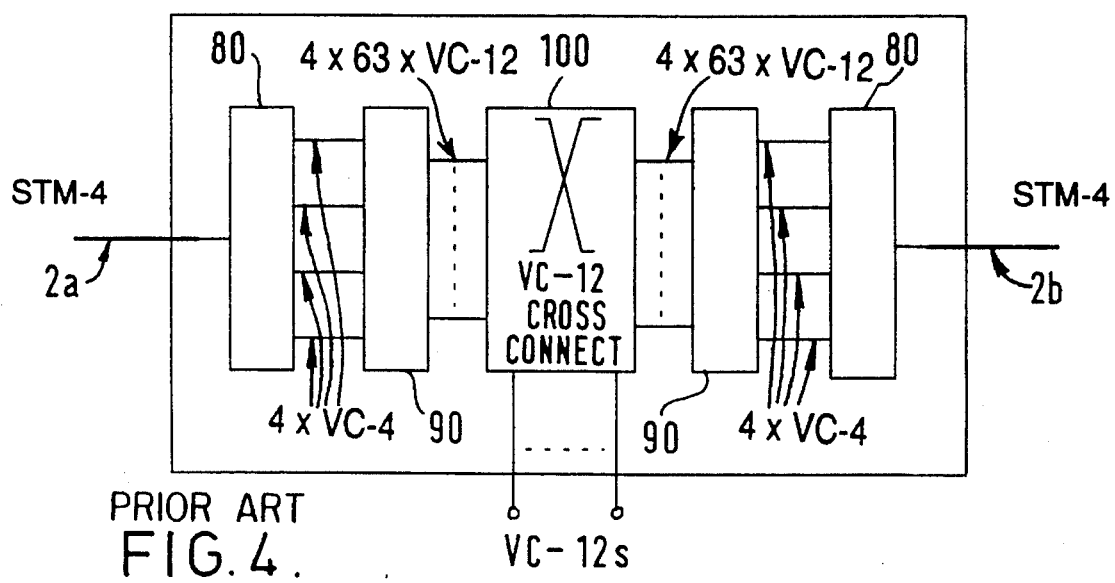

It will also be seen that, as in the distributed multiplexer of FIG. 6, the FIG. 7 equipment permits up to 63 2 Mbit/s signals to be dropped/inserted from/to any main channel (VC-4) in an STM-4 transmission line, whilst being simpler than the previous proposals described above with reference to FIGS. 3 and 4.

The main channels of the transmission line can be provided by a single physical line, as described above, or by separate respective physical lines if desired. Rather than time-division multiplexing (TDM), wavelength-division multiplexing (WDM) can be used to enable several optical signals, having different respective wavelengths, to pass along a single optical transmission line. For example, instead of the time-division multiplexed STM-4 optical transmission line 2 described previously, as shown in FIG. 8 it would be possible to use a wavelength division-multiplexed optical transmission line 102 carrying 4 STM-1 optical signals at different respective wavelengths $\lambda_1$ to $\lambda_4$. In this case, at each interface with a transmission line portion 102a or 102b, in place of the time slot assignment units TSA 3a and 3b of FIG. 8 (which each have an STM-4 optical port on the transmission line side and four STM-1 electrical ports on the TSI side), there are provided VC-4 TSA units 103a and 103b having 4 STM-1 electrical ports on each side. The four ports on the line side of the TSA unit 103a or 103b are connected to respective ports of an optical transceiver 107a or 107b which converts the four STM-1 electrical signals to respective STM-1 optical signals having the wavelengths $\lambda_1$ to $\lambda_4$, and vice versa. In the outgoing direction the STM-1 optical signals are multiplexed together by a wavelength muldem 108a or 108b to produce a wavelength-division multiplexed optical aggregate signal. In the incoming direction, the wavelength-division multiplexed optical aggregate signal carried by the transmission line 102 is demultiplexed by the muldem 108a or 108b into its four constituent STM-1 optical signals at the different wavelengths $\lambda_1$ to $\lambda_4$.

Figure 8:
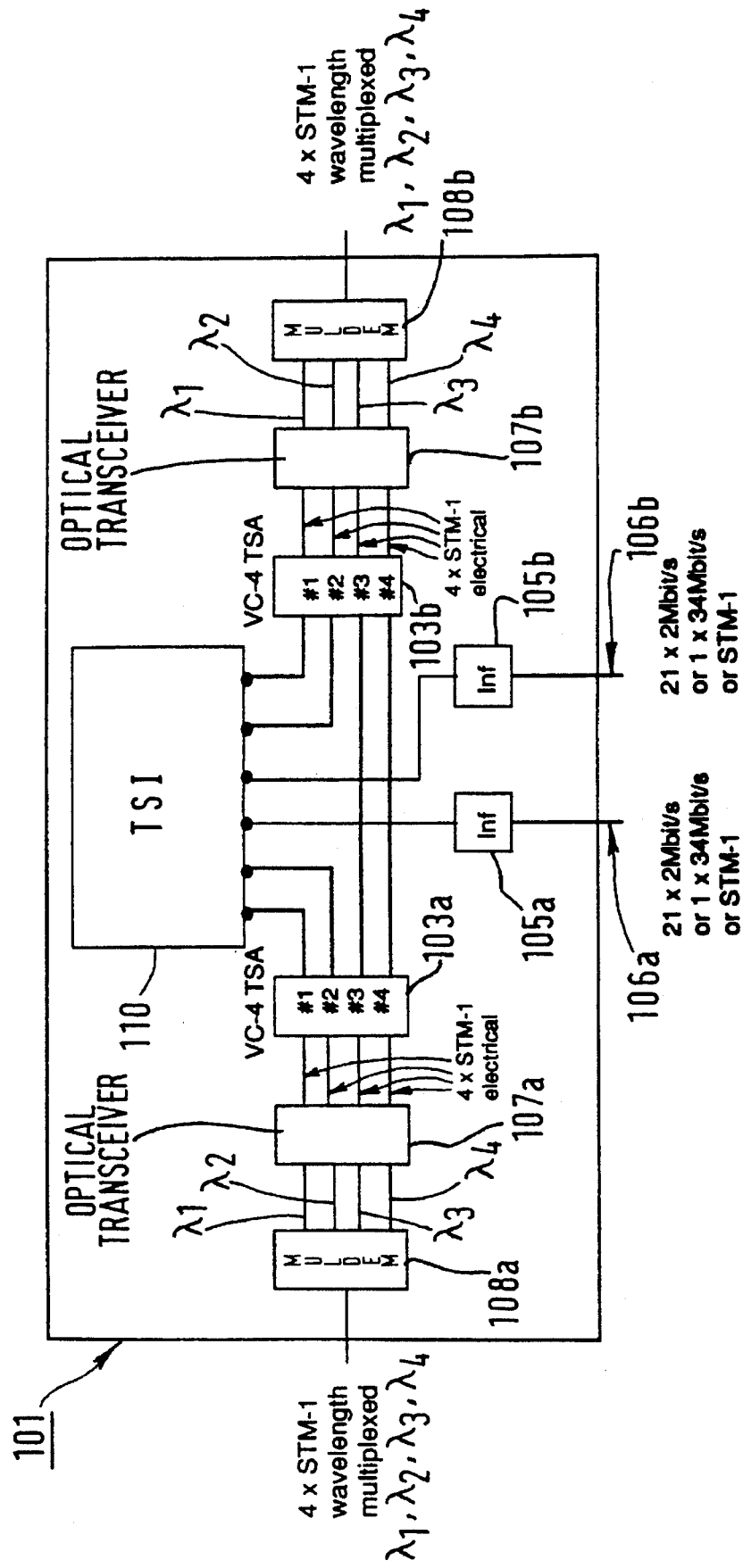
FIGS. 8 and 9 are respective block diagrams of add/drop multiplexer units for use in further add/drop multiplexers embodying the present invention.

The add/drop multiplexer unit 101 of FIG. 8 has its TSI 110 connected in the same manner as the TSI 10a of the add/drop multiplexer unit 1a of FIG. 5A. As will be appreciated, by employing further such add/drop multiplexer units 101 at respective further tributary connection nodes along the transmission line 102, with different pairs of the main channels passing through the respective TSIs of the different units 111 (as in FIGS. 5A to 5D), it becomes possible to interchange signals between the tributary channels and three or all four of the main channels, even through each TSI itself has insufficient capacity to afford access to all the main channels at its tributary connection node.

In a further embodiment, instead of employing wavelength-division multiplexing, it would be possible to use the 4 STM-1 electrical signals on the line side of each VC-4 TSA unit 103a or 103b to modulate respective sub-carrier signals, and to combine the four modulated sub-carrier signals to produce a composite electrical signal, which is then being converted to an optical signal for transmission via the transmission line. Such a multiplexing technique is relatively inefficient, however, in terms of use of the available transmission line bandwidth.

Although the present invention has been described hereinbefore in the context of an SDH transmission line, it will be appreciated that embodiments of the present invention are applicable to provide connections between tributary channels and main channels of other types of communications network such as SONET (synchronous optical networks) networks and PDH (plesiochronous digital networks) networks.

Figure 9:
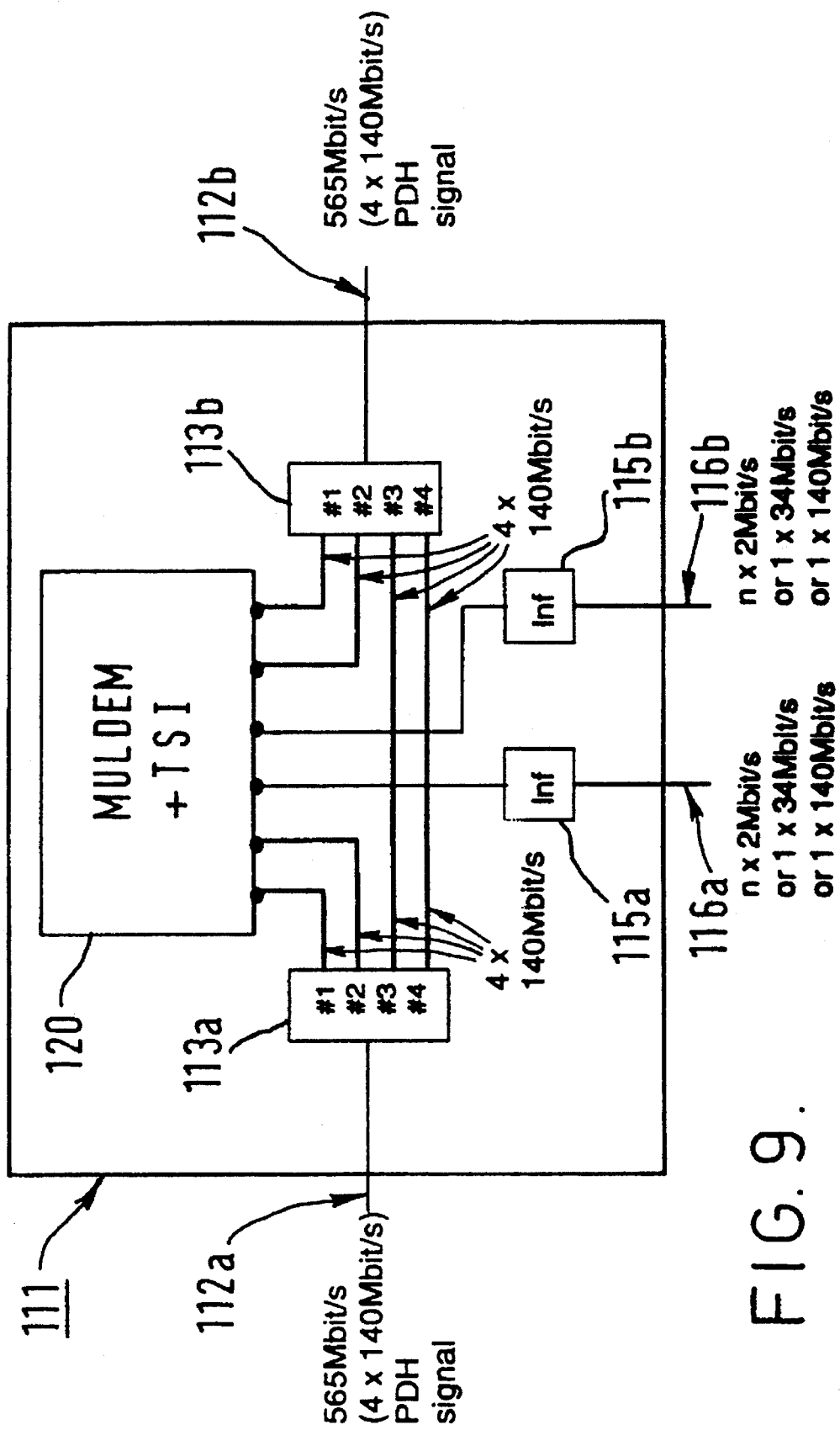

For example, as shown in FIG. 9, an add/drop multiplexer unit 111, for use at a tributary connection node of a PDH optical transmission line 112, has the same basic configuration as the add/drop multiplexer units 1a to 1d of FIGS. 5A to 5D. In the example shown the transmission line 112 carries a PDH signal which consists of 4 140 Mbit/s individual PDH signals multiplexed together. These 140 Mbit/s PDH signals constitute respectively the main channels of the PDH transmission line 112.

The unit 111 includes first and second combined optical transceiver and electrical muldem units 113a and 113b for providing access to the individual 140 Mbit/s PDH signals (main channels) in the transmission line portions 112a and 112b, and first and second interface units 115a and 115b connected to respective tributary channels 116a and 116b. In this case, the tributary channels connected to each interface unit can be n 2 Mbit/s PDH signals (n≦64, typically n=16) or a single 34 Mbit/s PDH signal, or a single 140 Mbit/s PDH signal.

The unit 111 also includes a time slot interchange unit (TSI) 120 which in this case contains a 2-8-34 140 Mbit/s muldem and a cross connection unit for 2 Mbit/s signals. The muldem in the TSI 120 provides access, down to the 2 Mbit/s level, to all the signals in the first and second 140 Mbit/s signals (first and second main channels) carried by the transmission line 112, and, if required, to all the signals in the tributary channels 116a and 116b.

The cross connection unit in the TSI 120 then enables signal interchange, at the 2 Mbit/s level (instead of VC-12 level as in the SDH ADM unit described hereinbefore), between the first and second main channels and the two tributary channels 116a and 116b.

The add/drop multiplexer unit 111 of FIG. 9 has its TSI 120 connected in the same manner as the TSI 10a of the add/drop multiplexer unit 1a of FIG. 5A. As will be appreciated, by employing further such add/drop multiplexer units 111 at respective further tributary connection nodes along the PDH transmission line 112, with different pairs of the main channels (140 Mbit/s signals) passing through the respective TSIs of the different units 111 (as in FIGS. 5A to 5D), it becomes possible to interchange signals between the tributary channels and three or all four of the main channels, even through each TSI itself has insufficient capacity to afford access to all the main channels at its tributary connection node.

Figure 10:
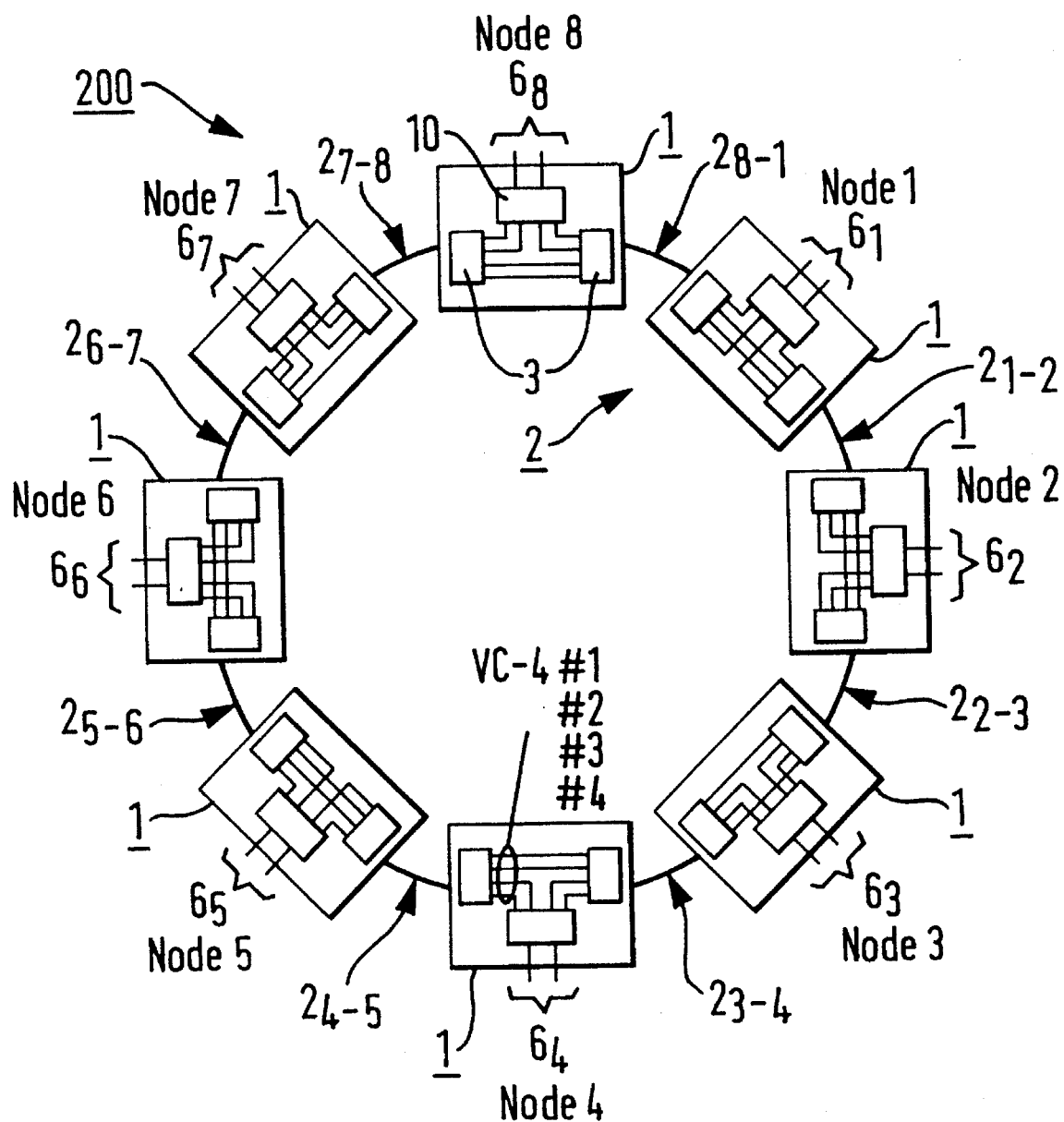
FIG. 10 is a schematic view of an optical ring network employing add/drop multiplexers embodying the present invention.

FIG. 10 shows an example of the use of add/drop multiplexer apparatus embodying the present invention in an optical ring network. In the FIG. 10 example, an optical ring network 200 with 8 nodes has an add/drop multiplexer 1 embodying the present invention at each node. The nodes are connected together by an STM-4 ring 2 made up of individual STM-4 transmission line portions $2_{1-2}$–$2_{8-1}$.

Figure 11:
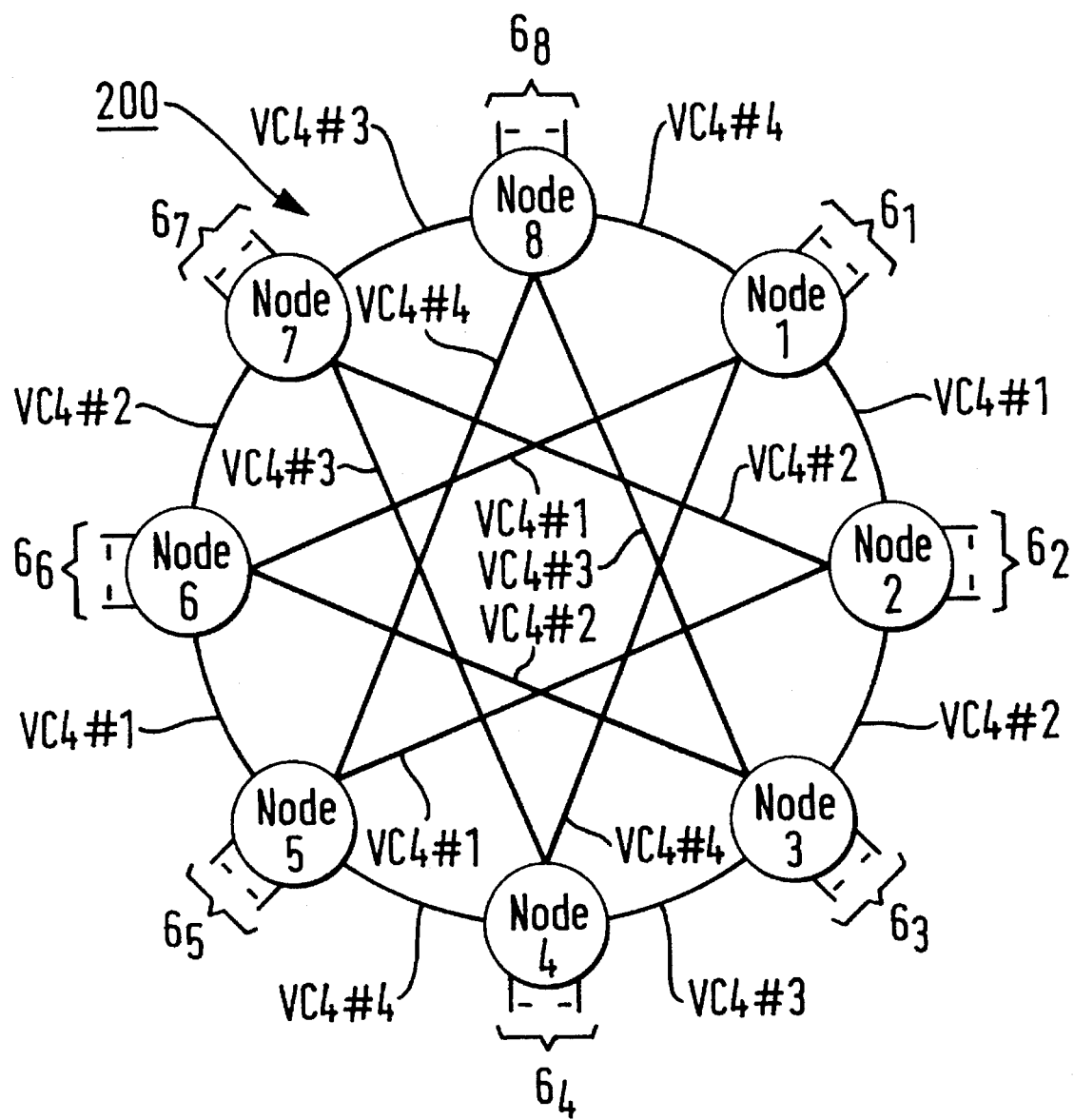
FIG. 11 is a diagram illustrating connections provided by the FIG. 10 ring network.

As shown schematically in FIG. 11, which illustrates the VC-4 connectivity in the case of the FIG. 10 ring, this arrangement can provide access at each node to both adjacent nodes and to every fourth node in the ring. This allows traffic to be routed between any two nodes in the ring, but the maximum bandwidth utilisation depends on the traffic distribution, the chosen connectivity pattern and the number of nodes.

Firstly, bandwidth utilisation in the case in which the traffic distribution within the ring is uniform will be considered. The traffic connection matrix for node 1 of the FIG. 10 eight node ring is shown in Table 1 below.

In Table 1, $C_{12}$ denotes the VC-4 used to transport the traffic at node 1 destined for node 2 over link 1-2 (the transmission line portion $2_{1-2}$); $C_{13}$ denotes the VC-4 used to transport the traffic at node 1 destined for node 3 over link 1-2; etc.

TABLE 1

| | Link | | | | | | | |
|---|---|---|---|---|---|---|---|---|
| | 1-2 | 2-3 | 3-4 | 4-5 | 5-6 | 6-7 | 7-8 | 8-1 |
| Traffic: 1-2 | $C_{12}$ | | | | | | | |
| Traffic: 1-3 | $C_{13}$ | $C_{23}$ | | | | | | |
| Traffic: 1-4 | $C_{14}$ | $C_{24}$ | $C_{34}$ | | | | | |
| Traffic: 1-5 | $C_{15}$ | $C_{25}$ | $C_{35}$ | $C_{45}$ | | | | |
| Traffic: 1-6 | $C_{16}$ | $C_{26}$ | $C_{36}$ | $C_{46}$ | $C_{56}$ | | | |
| Traffic: 1-7 | $C_{17}$ | $C_{27}$ | $C_{37}$ | $C_{47}$ | $C_{57}$ | $C_{67}$ | | |
| Traffic: 1-8 | $C_{18}$ | $C_{28}$ | $C_{38}$ | $C_{48}$ | $C_{58}$ | $C_{68}$ | $C_{78}$ | |

Table 2 presents a traffic distribution matrix for traffic from node 1, illustrating the distribution of traffic amongst the VC-4s for traffic sourced from node 1. In Table 2, $S_{11}$ denotes the sum of the traffic allocated to VC#1 for link 1-2 as defined in the connection matrix of Table 1; $S_{12}$ denotes the sum of the traffic allocated to VC#1 for link 2-3 (the transmission line portion $2_{2-3}$) as defined in the Table 1 connection matrix; etc.

TABLE 2

| | Link | | | | | | | |
|---|---|---|---|---|---|---|---|---|
| | 1-2 | 2-3 | 3-4 | 4-5 | 5-6 | 6-7 | 7-8 | 8-1 |
| VC#1 | $S_{11}$ | $S_{12}$ | $S_{13}$ | $S_{14}$ | $S_{15}$ | $S_{16}$ | $S_{17}$ | $S_{18}$ |
| VC#2 | $S_{21}$ | $S_{22}$ | $S_{23}$ | $S_{24}$ | $S_{25}$ | $S_{26}$ | $S_{27}$ | $S_{28}$ |
| VC#3 | $S_{31}$ | $S_{32}$ | $S_{33}$ | $S_{34}$ | $S_{35}$ | $S_{36}$ | $S_{37}$ | $S_{38}$ |
| VC#4 | $S_{41}$ | $S_{42}$ | $S_{43}$ | $S_{44}$ | $S_{45}$ | $S_{46}$ | $S_{47}$ | $S_{48}$ |

By virtue of the symmetry of the "cyclic" connectivity pattern employed in apparatus embodying the present invention, the traffic distribution matrix of Table 2 can be used to determine the total amount of traffic allocated to each VC-4, taking into account traffic from all the nodes. The results are given in Table 3, which presents a traffic distribution matrix for traffic from all nodes.

TABLE 3

| | 1-2 | 2-3 | 3-4 | 4-5 | 5-6 | 6-7 | 7-8 | 8-1 |
|---|---|---|---|---|---|---|---|---|
| VC#1 | $T_{11}$ | $T_{12}$ | $T_{13}$ | $T_{14}$ | $T_{15}$ | $T_{16}$ | $T_{17}$ | $T_{18}$ |
| VC#2 | $T_{21}$ | $T_{22}$ | $T_{23}$ | $T_{24}$ | $T_{25}$ | $T_{26}$ | $T_{27}$ | $T_{28}$ |
| VC#3 | $T_{31}$ | $T_{32}$ | $T_{33}$ | $T_{34}$ | $T_{35}$ | $T_{36}$ | $T_{37}$ | $T_{38}$ |
| VC#4 | $T_{41}$ | $T_{42}$ | $T_{43}$ | $T_{44}$ | $T_{45}$ | $T_{46}$ | $T_{47}$ | $T_{48}$ | where:

VC#1 (Link 1-2)=$T_{11}$=$S_{11}$+$S_{22}$+$S_{33}$+$S_{44}$+$S_{15}$+$S_{26}$+$S_{37}$+$S_{48}$ VC#2 (Link 1-2)=$T_{21}$=$S_{21}$+$S_{32}$+$S_{43}$+$S_{14}$+$S_{25}$+$S_{36}$+$S_{47}$+$S_{18}$ VC#3 (Link 1-2)=$T_{31}$=$S_{31}$+$S_{42}$+$S_{13}$+$S_{24}$+$S_{35}$+$S_{46}$+$S_{17}$+$S_{28}$ VC#4 (Link 1-2)=$T_{41}$=$S_{41}$+$S_{12}$+$S_{23}$+$S_{34}$+$S_{45}$+$S_{16}$+$S_{27}$+$S_{38}$ VC#1 (Link 2-3)=$T_{12}$=$S_{12}$+$S_{23}$+$S_{34}$+$S_{45}$+$S_{16}$+$S_{27}$+$S_{38}$+$S_{41}$=$T_{41}$ VC#2 (Link 2-3)=$T_{22}$=$S_{22}$+$S_{33}$+$S_{44}$+$S_{15}$+$S_{26}$+$S_{37}$+$S_{48}$+$S_{11}$=$T_{11}$ VC#3 (Link 2-3)=$T_{32}$=$S_{32}$+$S_{43}$+$S_{14}$+$S_{25}$+$S_{36}$+$S_{47}$+$S_{18}$+$S_{21}$=$T_{21}$ VC#4 (Link 2-3)=$T4_{42}$=$S_{42}$+$S_{13}$+$S_{24}$+$S_{35}$+$S_{46}$+$S_{17}$+$S_{28}$+$S_{31}$=$T_{31}$ etc It can be seen from the above expressions that the total traffic distribution can be reduced to the form shown in Table 4.

TABLE 4

| | Link | | | | | | | |
|---|---|---|---|---|---|---|---|---|
| | 1-2 | 2-3 | 3-4 | 4-5 | 5-6 | 6-7 | 7-8 | 8-1 |
| VC#1 | $T_{11}$ | $T_{41}$ | $T_{31}$ | $T_{21}$ | $T_{11}$ | $T_{41}$ | $T_{31}$ | $T_{21}$ |
| VC#2 | $T_{21}$ | $T_{11}$ | $T_{41}$ | $T_{31}$ | $T_{21}$ | $T_{11}$ | $T_{41}$ | $T_{31}$ |
| VC#3 | $T_{31}$ | $T_{21}$ | $T_{11}$ | $T_{41}$ | $T_{31}$ | $T_{21}$ | $T_{11}$ | $T_{41}$ |
| VC#4 | $T_{41}$ | $T_{31}$ | $T_{21}$ | $T_{11}$ | $T_{41}$ | $T_{31}$ | $T_{21}$ | $T_{11}$ |

The maximum bandwidth utilisation is obtained when each VC-4 transports 63×2 Mbit/s information signals, so that for example:

$T_{11}$=$T_{21}$=$T_{31}$=$T_{41}$=63×2 Mbit/s

If the traffic cannot be distributed equally between the VC-4s, then the traffic between the nodes must be reduced so that the maximum traffic carried by one VC-4 is 63×2 Mbit/s.

The bandwidth utilisation (BU) is given by:

BU=($T_{11}$+$T_{21}$+$T_{31}$+$T_{41}$)/(252×2 Mbit/s)

where $T_{ij}$ is at maximum 63×2 Mbit/s.

Figure 12:
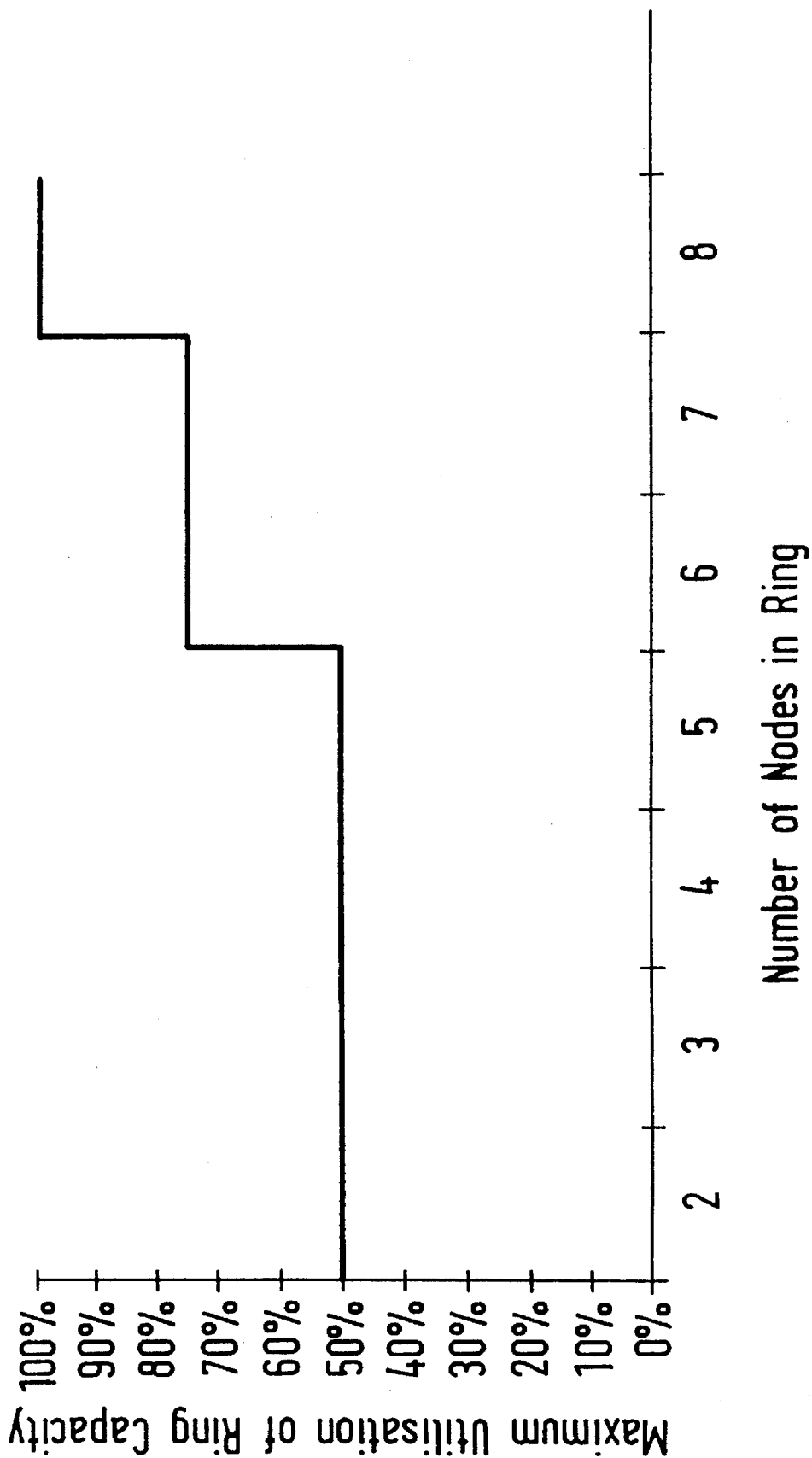
FIG. 12 is a graph illustrating the relationship between bandwidth utilisation and the number of nodes in the FIG. 10 ring network.

FIG. 12 shows a graph illustrating the variation of the bandwidth utilisation (BU) according to the number of nodes in the ring. As seen from FIG. 12, with four nodes the bandwidth utilisation is limited to 50%, but with only eight nodes the utilisation of ring capacity can be equal to that which can be achieved using a full cross-connect capability at each node. In general, it is possible to achieve 100% bandwidth utilisation for rings with (8+4 n) nodes, where n is zero or a positive integer.

The significance of this result is that by using the "cyclic" connectivity approach according to the present invention, the same performance can be achieved as for a ring which has sufficient capacity at each node to cross-connect all the VC-12s in the aggregate line signal, but this is achieved with only 60% of the number of switch ports and as little as 36% of the switch circuitry (depending on the switch architecture) at each node.

The "cyclic" connectivity approach has the additional advantage that not all of the traffic passes through the TSI unit at every node and so the end-to-end delay is reduced.

FIG. 13 presents a concrete example of the VC-4 connectivity in the case of an 8 node ring. The figures in the individual boxes in the Table of FIG. 13 each represent the number of 2 Mbit/s channels in the link or virtual container concerned.

Figure 14:
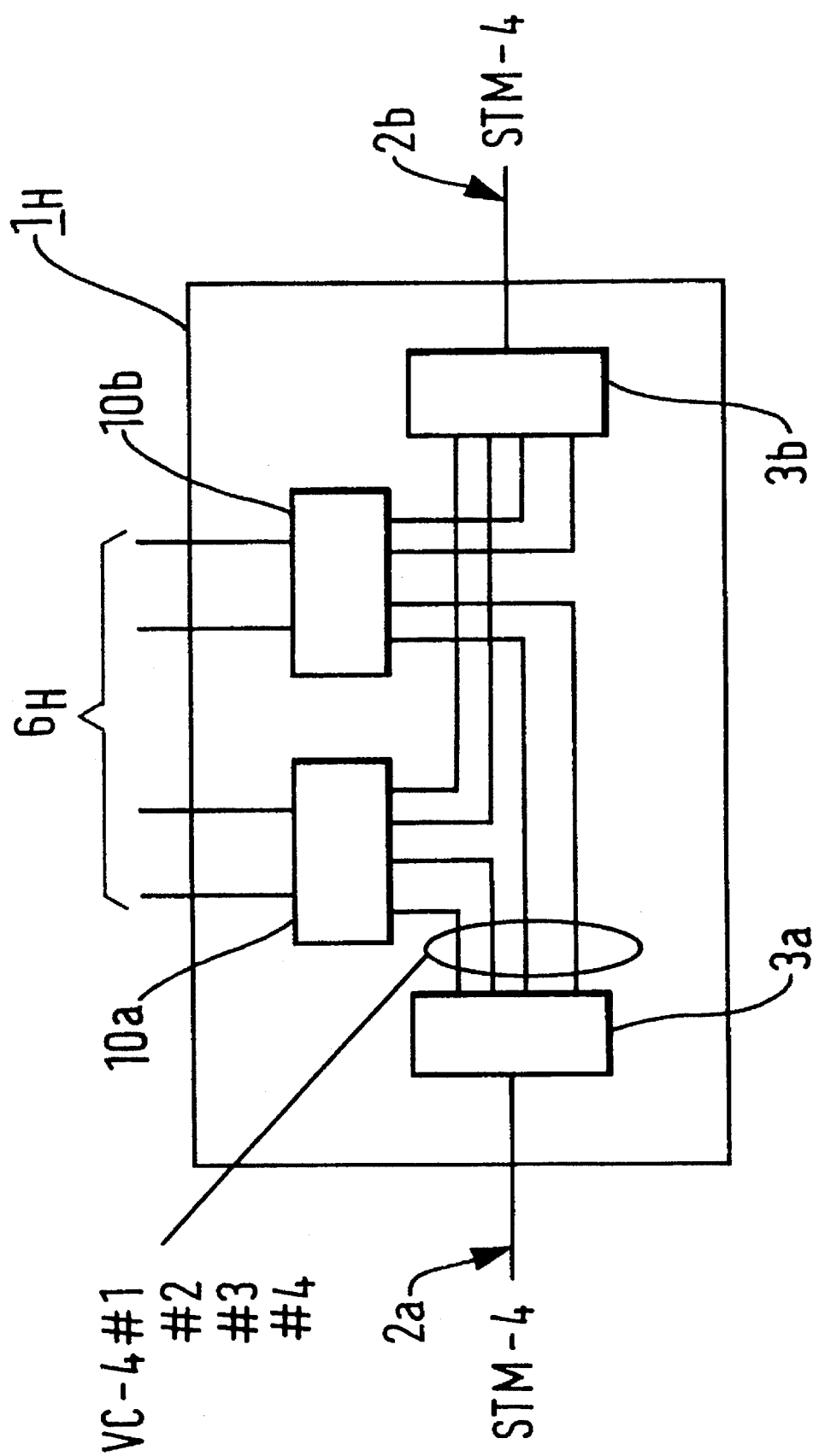
FIG. 14 is a block diagram of another add/drop multiplexer embodying the present invention for use at a hub connection node of a ring network.

Bandwidth utilisation in the case in which the traffic distribution is non-uniform will now be considered. The cyclic connectivity approach according to the present invention can be applied to a network having a hub traffic distribution. In this case, however, it is necessary to access all four VC-4s at the hub node. This can be achieved by using a modified add/drop multiplexer $1_H$ at the hub node, as shown in FIG. 14. This ADM $1_H$ includes two TSI units 10a and 10b, the first TSI unit 10a being connected to access VC-4#1 and #2 from both the STM-transmission line portions 2a and 2b connected to the hub node, and the second TSI unit 10b being connected to access VC-4#3 and #4 from the line portions 2a and 2b. A single TSI unit is used at all other nodes in the ring.

With this arrangement it is possible to achieve 100% bandwidth utilisation for a ring with any number of nodes.

In an add/drop multiplexer embodying the present invention, there can be any appropriate number of tributary channels connected to each time slot interchange unit.

It is not essential that each time slot interchange unit be connected to tributary channels. For example, the single equipment add/drop multiplexer of FIG. 7 need not have any tributary ports connected to one or more of its four time slot interchange units. Equally, in a distributed add/drop multiplexer as described hereinbefore with reference to FIG. 6, the add/drop multiplexer units of some of the nodes need not have any tributary ports.

It will also be understood that, whilst the foregoing embodiments have provided 2–622 Mbit/s add/drop multiplexers, the tributary signals and aggregate signals can have different rates than 2 and 622 Mbit/s, as required. The North American digital hierarchy rates can be used, for example.

What I claim is:

1. An add/drop multiplexer device, for use at a connection node of a communications network to connect main channels and a tributary channel of the communications network, the device being provided at said connection node and comprising:

a first signal interchange unit, through which a first one of said main channels passes, said first signal interchange unit having a tributary port for connection to said tributary channel and being operable to cause an information signal to pass between said first one of said main channels and said tributary channel; and a second signal interchange unit, through which said first main channel and a second one of said main channels pass, said second signal interchange unit being operable to cause said information signal to pass between the first and second main channels, thereby enabling said information signal to be transferred at said connection node between said tributary channel and said second main channel.

2. The device as claimed in claim 1, wherein said second signal interchange unit further has a tributary port for connection to a further tributary channel and is operable to cause said information signal to pass between said first main channel and said further tributary channel.

3. The device as claimed in claim 1, wherein the communications network is a synchronous digital hierarchy network, the main channels of which are formed by respective higher-order virtual containers, and said information signals are transported through the network in respective lower-order virtual containers.

4. The device as claimed in claim 3, wherein said higher-order virtual containers include VC-4 virtual containers, and said lower-order virtual containers include VC-11 or VC-12 virtual containers.

5. An add/drop multiplexer device, for use at a connection node of a communications network to connect main channels and a tributary channel of the communications network, the device being provided at said connection node and comprising:

a first signal interchange unit, through which a first one of said main channels passes, said first signal interchange unit having a tributary port for connection to a first one of said tributary channels, and being operable to cause an information signal to pass between said first main channel and said first tributary channel;

a second signal interchange unit, through which said first main channel and a second one of said main channels pass, said second signal interchange unit being operable to cause said information signal to pass between said first and second main channels, thereby enabling said information signal to be transferred between said tributary channel and said second main channel, said second signal interchange unit also having a tributary port for connection to a second one of said tributary channels and being operable to cause said information signal to pass between said first main channel and said second tributary channel; and a third signal interchange unit, through which said second main channel and a third one of said main channels pass, said third signal interchange unit being operable to cause an information signal to pass between the second and third main channels;

said third main channel also passing through said first signal interchange unit, and said first signal interchange unit being operable to cause an information signal to pass between said first tributary channel and said third main channel.

6. The device as claimed in claim 5, wherein the communications network is asynchronous digital hierarchy network the main channels of which are formed by respective higher-order virtual containers, and said information signals are transported through the network in respective lower-order virtual containers.

7. The device as claimed in claim 6, wherein said higher-order virtual containers include VC-4 virtual containers, and said lower-order virtual containers include VC-11 or VC-12 virtual containers.

8. An add/drop multiplexer device, for use at a connection node of a communications network to connect main channels and a tributary channel of the communications network, the device being arranged at said connection node and comprising:

M signal interchange units, where M is the number of main channels of the communications network, through each of which units a group of N main channels passes, where N<M, each unit being operable to cause an information signal to pass between any two main channels of said group passing therethrough, and at least one of the signal interchange units having a tributary port for connection to said tributary channel and being operable to cause an information signal to pass between said tributary channel and any main channel of said group of main channels passing through said signal interchange unit;

said groups being such that each main channel passes through N of the signal interchange units, and each group is different from every other group.

9. The device as claimed in claim 8, wherein said network has a transmission line for providing said main channels of the network, and the device is interposed in said transmission line at said connection node so that said M signal interchange units are connected together in series between two sides of the transmission line at said connection node;

and wherein the device further comprises:

two muldem units for connection respectively to said two sides of said transmission line and also connected respectively to first and last signal interchange units of said series, said muldem units serving to provide access to individual main channels of the transmission line on each of said two sides thereof; and channel connection lines, extending between each pair of adjacent signal interchange units of the series, for providing respective connection paths for the main channels between said adjacent signal interchange units.

10. The device as claimed in claim 9, wherein said transmission line is a higher-rate synchronous digital hierarchy transmission line STM-N.

11. The device as claimed in claim 8, wherein M=4 and N=2, and the group passing through a first signal interchange unit is made up of first and second main channels, the group passing through a second signal interchange unit is made up of the second and third main channels, the group passing through a third signal interchange unit is made up of the third and fourth main channels, and the group passing through a fourth signal interchange unit is made up of the fourth and the first main channels.

12. The device as claimed in claim 8, wherein the communications network is a synchronous digital hierarchy network the main channels of which are provided by respective higher-order virtual containers, and said information signals are transported through the network in respective lower-order virtual containers.

13. The device as claimed in claim 12, wherein said higher-order virtual containers include VC-4 virtual containers, and said lower-order virtual containers include VC-11 or VC-12 virtual containers.

14. An add/drop multiplexer apparatus, for use in a ring network having four main channels, the apparatus comprising:

(8+4n) signal interchange units, where n is zero or a positive integer, said signal interchange units being arranged at respective connection nodes around the ring network;

each signal interchange unit being arranged so that a pair of said main channels passes therethrough and being operable to cause an information signal to pass between the two main channels of the pair;

said signal interchange units being arranged in sets of four units such that in each set each main channel passes through two signal interchange units of the set, and a different pair of main channels passes through each signal interchange unit of the set;

at least one of said signal interchange units having a tributary port for connection to a tributary channel of the ring network and being operable to cause an information signal to pass between said tributary channel and either main channel of said pair of main channels passing therethrough.

15. The apparatus as claimed in claim 14, wherein said ring network is a synchronous digital hierarchy network, the main channels of which are provided by respective higher-order virtual containers, and said information signals are transported through the network in respective lower-order virtual containers.

16. The apparatus as claimed in claim 15, wherein said higher-order virtual containers include VC-4 virtual containers, and said lower-order virtual containers include VC-11 or VC-12 virtual containers.

17. The apparatus as claimed in claim 14, and further comprising a series of individual add/drop multiplexer devices arranged respectively at said connection nodes around the ring network, said ring network having a transmission line which provides said main channels between the add/drop multiplexer devices of said series;

each add/drop multiplexer device including:

one of said signal interchange units; and two muldem units, connected respectively to two sides of said transmission line at a connection node concerned and also connected within the add/drop multiplexer device to one another and to the signal interchange unit of the add/drop multiplexer device;

said muldem units serving to provide access to individual main channels of the transmission line on each of said two sides thereof and also serving to connect two of accessed main channels of one side and the corresponding two accessed main channels of the other side to the signal interchange unit of the add/drop multiplexer device, whilst connecting two remaining accessed main channels of said one side directly to the corresponding two accessed main channels of said other side.

18. The apparatus as claimed in claim 17, and further comprising, at a hub connection node of the ring network, a further add/drop multiplexer device including:

two of said signal interchange units; and two muldem units connected respectively to the two sides of said transmission line at the hub connection node and also connected within the further add/drop multiplexer device to the two of signal interchange units thereof;

said muldem units of said further add/drop multiplexer device serving to provide access to the individual main channels of the transmission line on each of said two sides thereof and also serving to connect two of the accessed main channels of one side and the corresponding two accessed main channels of the other side to one of said two signal interchange unit of the further add/drop multiplexer device and to connect the remaining two accessed main channels of said one side and the corresponding two accessed main channels of said other side to the other of said two signal interchange units of the further add/drop multiplexer device, so that at the hub connection node there is access to all of the main channels of the ring network.

* * * * *